United States Patent
Ilechko

(10) Patent No.: US 7,945,959 B2
(45) Date of Patent: May 17, 2011

(54) SECURE PHYSICAL DISTRIBUTION OF A SECURITY TOKEN THROUGH A MOBILE TELEPHONY PROVIDER'S INFRASTRUCTURE

(75) Inventor: Paul Ilechko, Skillman, NJ (US)

(73) Assignee: International Business Machines Corporation, Armonk, NY (US)

( * ) Notice: Subject to any disclaimer, the term of this patent is extended or adjusted under 35 U.S.C. 154(b) by 970 days.

(21) Appl. No.: 11/764,349

(22) Filed: Jun. 18, 2007

(65) Prior Publication Data

US 2008/0313457 A1 Dec. 18, 2008

(51) Int. Cl.
*G06F 7/04* (2006.01)
*H04L 9/00* (2006.01)

(52) U.S. Cl. .......................................... 726/26; 380/277
(58) Field of Classification Search .................. 726/26; 380/277
See application file for complete search history.

(56) References Cited

U.S. PATENT DOCUMENTS

| | | | |
|---|---|---|---|
| 6,223,291 B1 * | 4/2001 | Puhl et al. ...................... | 726/28 |
| 6,516,316 B1 * | 2/2003 | Ramasubramani et al. ........... | 1/1 |
| 6,591,095 B1 * | 7/2003 | Palaniswamy et al. ....... | 455/411 |
| 7,072,886 B2 | 7/2006 | Salmenkaita et al. | |
| 7,690,027 B2 * | 3/2010 | Sandberg ......................... | 726/9 |
| 2002/0144109 A1 | 10/2002 | Benantar et al. | |
| 2003/0084311 A1 * | 5/2003 | Merrien et al. ............... | 713/191 |
| 2003/0093665 A1 | 5/2003 | Cooper et al. | |
| 2003/0154376 A1 * | 8/2003 | Hwangbo ..................... | 713/173 |
| 2004/0053642 A1 * | 3/2004 | Sandberg et al. ............. | 455/558 |
| 2005/0069137 A1 * | 3/2005 | Landrock ...................... | 380/278 |
| 2005/0149454 A1 * | 7/2005 | Chen et al. ...................... | 705/64 |
| 2005/0227669 A1 | 10/2005 | Haparnas | |
| 2006/0002556 A1 * | 1/2006 | Paul ............................... | 380/270 |
| 2006/0133615 A1 * | 6/2006 | Bade et al. ..................... | 380/277 |
| 2006/0165060 A1 | 7/2006 | Dua | |

(Continued)

FOREIGN PATENT DOCUMENTS

WO WO03107710 A1 12/2003

OTHER PUBLICATIONS

Traynor, P., et al., "Mitigation Attacks on Open Functionality In SMS-Capable Cellular Networks", MobiCom'06, pp. 182-193, Sep. 23-26, 2006, Los Angeles, USA.

(Continued)

*Primary Examiner* — Techane J Gergiso
(74) *Attorney, Agent, or Firm* — Brian K. Buchheith; Scott M. Garrett; Patent on Demand, P.A.

(57) ABSTRACT

The present invention discloses a system and method of leveraging mobile telephone provider assets and distribution network to securely deliver security tokens, such as PKI certificates. The invention is not limited to using a mobile telephony infrastructure and other pre-existing distributions can also be used. In the invention, a user requested security token can be delivered to a storefront associated with a mobile telephone provider. The storefront can be one proximate to a requesting user. An optional activation key can also be conveyed to the requesting user. The requesting user can be required to physically travel to the storefront to receive the security token. At the storefront, an identity of the requesting user can be verified, such as through photo identification. The security token can be provided when the requesting user has been successfully verified. Use of the security token can still require activation involving the activation key.

20 Claims, 3 Drawing Sheets

U.S. PATENT DOCUMENTS

2007/0192590 A1* 8/2007 Pomerantz et al. ............ 713/157
2008/0077534 A1* 3/2008 Son ................................. 705/76
2008/0187119 A1* 8/2008 Vinokurov et al. ...... 379/142.05

OTHER PUBLICATIONS

Kambouratis, G., et al., "Performance Evaluation of Public Key-Based Authentication in Future Mobile Communications Systems", EURASIP Journal on Wireless Communications and Networking, pp. 184-197, Jan. 2004.

Varshney, U., "Location Management for Mobile Commerce Applications in Wireless Internet Environment," ACM Transactions on Internet Technology, vol. 3, No. 3, Aug. 2003, pp. 236-255.

Jelekainen, P., "GSM-PKI Solution Enabling Secure Mobile Communications", Int'l J. of Medical Informatics, vol. 73, No. 3, pp. 317-320, Mar. 31, 2004.

Joshi, D., et al., "Secure, Redundant, and Fully Distributed Key Management Scheme for Mobile Ad Hoc Networks: An Analysis", EURASIP Journal onWireless Communications and Networking, pp. 579-589, Apr. 2005.

Garman, J., "Kerberos: The Definitive Guide," [online] Safari Books Online, 2008, [retrieved Sep. 12, 2008] retrieved from the Internet: <http://proquest.safaribooksonline.com/0596004036/kerberos-CHP-10-SECT-1>.

* cited by examiner

SECURE PHYSICAL DISTRIBUTION OF A SECURITY TOKEN THROUGH A MOBILE TELEPHONY PROVIDER'S INFRASTRUCTURE

BACKGROUND

1. Field of the Invention

The present invention relates to the field of cryptography, and more particularly, the secure distribution of a Public Key Infrastructure (PKI) certificate or other security token through a mobile telephony provider's infrastructure.

2. Description of the Related Art

User names and passwords are commonly used to authenticate a user for purposes of accessing secure content. By their nature, user name and password combinations can be very insecure. Conveyances of user name and password combinations are susceptible to interception through software. User name and passwords can also be intercepted in many other ways, including if someone watches the keys pressed while a password is typed. Passwords can also be weak in nature. Sometimes people have the habit of using repeating numbers, their birthday, or the name of someone or something they like. Such passwords are very easy to guess.

There are other, more secure methods of authentication. For example, Public Key Infrastructure (PKI) certificates are cryptographically generated tokens that can be used for authentication. These certificates are used to establish the identity of a party involved in a transmission of data. The use of PKI certificates for authentication involves the use of public and private key technology. The public key that is transmitted over the network is signed by a trusted third party, known as a certificate authority. The receiver of the certificate validates it against a set of trusted signing certificates stored in its local trust store. PKI certificates are constructed so they are very difficult to guess or to break using algorithmic methods.

Although PKI certificates generally provide a high level of protection, securely distributing these keys is difficult, in particular when attempting to provide them to a large population of otherwise unknown users. It is difficult to authoritatively establish the identity of a person over the internet in order to grant them a credential, and it is also problematic to attempt to convey that credential to a user over an insecure medium (e.g., the Internet). When conveyed, the PKI certificate can be intercepted. Once intercepted, the certificate can be used to fake the identity of the intended user.

What is needed is a secure means to distribute PKI certificates or other security tokens. Ideally, this distribution mechanism will not involve digitally conveying the certificate over a network since any counter-interception/encryption technique used during such a conveyance can be defeated. Optimally, PKI certificates, especially those protecting particularly valuable or sensitive resources, would be physically delivered to a verified user. The user would be required to provide verifiable physical proof as to their identity, such as a driver's license or similar artifacts. Such physical distribution of PKI certificates, however, would require an extensive infrastructure including a vast number of strategically positioned pick-up locations convenient for users. When PKI certificates are to be used for secure access to a large number of unrelated Web sites accessible over a public internet, the PKI pickup locations should span a wide geographic region, such as the continental United States.

SUMMARY OF THE INVENTION

The present invention implements a secure procedure of delivery of Public Key Infrastructure (PKI) certificates and other security keys through a pre-existing infrastructure of mobile telephony providers. In this invention, the customer can request the PKI certificate from the mobile telephony provider. The mobile telephony provider can then request the certificate from a certificate authority. The certificate authority can review the request, sign the certificate, and then return it to the mobile telephony provider through private secure channels that are unable to be intercepted. The mobile telephony provider can then mail a personal identification number (PIN) or other activation key associated with the certificate to the customer. The provider can also securely deliver the certificate to a storefront geographically convenient for the customer. The customer can travel to the storefront, present identification and their mobile telephony device to a customer service representative. The customer service representative, after verifying the identity of the person, can then transfer the PKI certificate to the user's phone. The user can then use the associated PIN to activate the certificate. The user can also optionally transfer the key to a computing system for further use.

The present invention can be implemented in accordance with numerous aspects consistent with the material presented herein. For example, one aspect of the present invention can include a method for distributing Public Key Infrastructure (PKI) certificates. In the method, an electronically submitted user request for a PKI certificate can be received from a remotely located computing device. The user request can be associated with a specific user. One of many different storefronts can be selected which are geographically located proximate to the specific user. A PKI certificate can be securely conveyed to the determined storefront along with a message including an identity of the specific user of the PKI certificate. A person can be required to physically be present in the storefront to pick-up the PKI certificate. This person can also be required to produce identifying information to verify that he/she is the specific user. In one embodiment, the distributor of the PKI certificates can be a mobile telephone provider. In another embodiment, the PKI certificate can be initially deactivated, where activation requires a PIN which is conveyed to a postal address of the specified user.

Another aspect of the present invention can include a method of leveraging mobile telephone provider assets to securely deliver security tokens. The method can include a step of distributing a user requested security token to a storefront associated with a mobile telephone provider. The storefront can be one proximate to a requesting user. An activation key can also be conveyed to the requesting user. The requesting user can be required to physically travel to the storefront to receive the security token. At the storefront, an identity of the requesting user can be verified, such as through photo identification. The security token can be provided when the requesting user has been successfully verified. Use of the security token can still require activation involving the activation key.

Still another aspect of the present invention can include a PKI certificate distribution system. The system can include a Web server, a certificate authority server, multiple storefronts, and a distribution server. The Web server can receive requests for PKI certificates from users via an unsecured network connection. The certificate authority server can generate PKI certificates. The storefronts can each include a storefront computing device. The distribution server can manage the PKI certificate request, can securely obtain PKI certificates from the certificate authority server for each received request, and can securely convey the obtained PKI certificates to one of the storefront computing devices proximately located to a requesting user. The requesting users can be required to physically travel to the storefronts to which the PKI certificates are delivered, where they can receive the certificate after presenting proper identification information. In one embodiment, the storefronts can be storefronts of a mobile telephone provider that is able to leverage a substantial pre-existing structure of storefronts and previously stored information regarding subscribers to securely convey PKI certificates to these subscribers.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
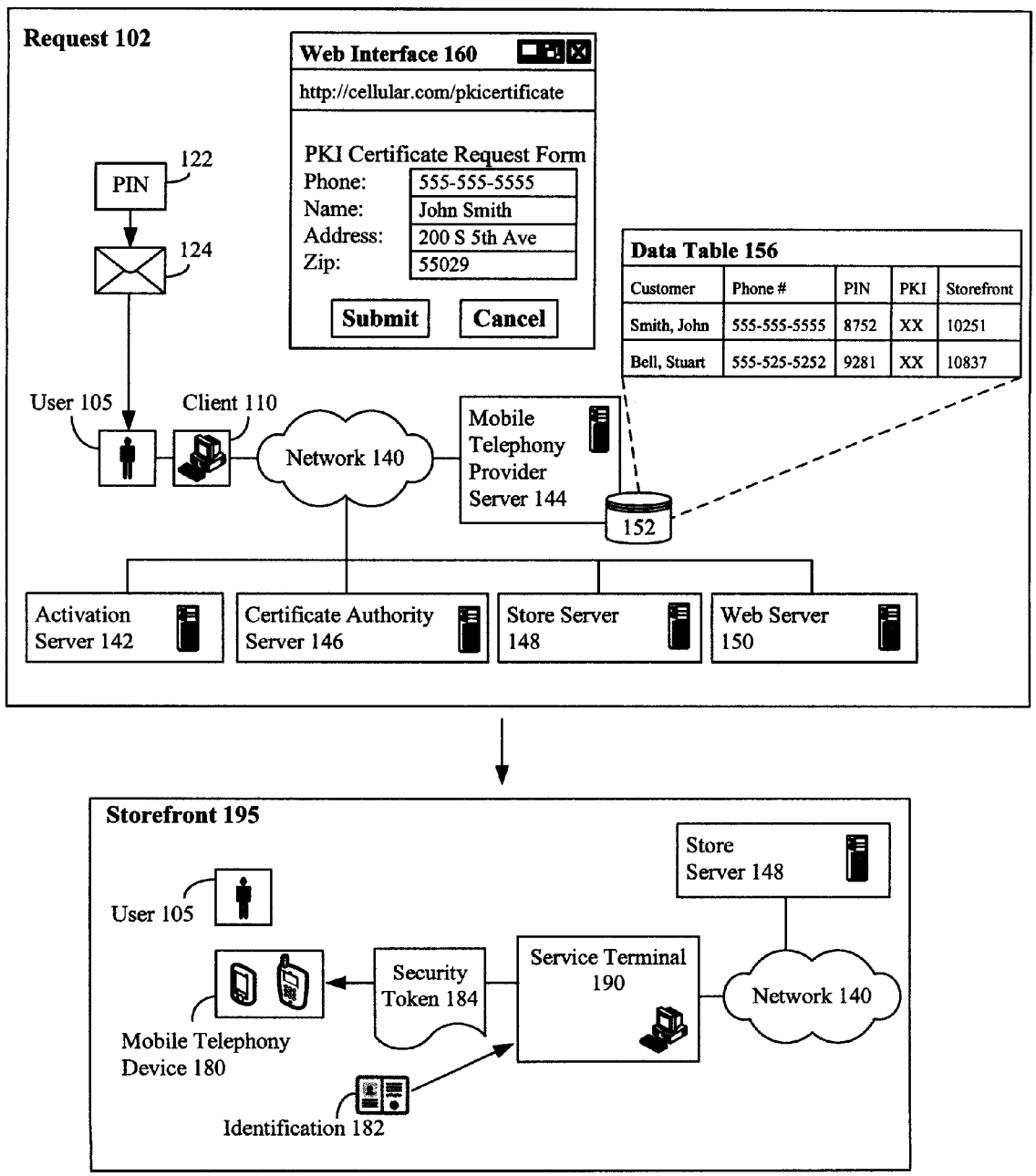
FIG. 1 is a schematic diagram showing a secure procedure to deliver a PKI certificate in accordance with an embodiment of the inventive arrangements disclosed herein.

FIG. 1 is a schematic diagram of a system 100 showing a secure procedure to deliver a PKI certificate 184 or other security token in accordance with an embodiment of the inventive arrangements disclosed herein. The system 100 can include numerous actions relating to obtaining and activating a security token (184). The actions include a request 102 action and a storefront 195 action. An additional action, an activation action 220, 250, is illustrated in system 200. Unlike traditional methodologies which digitally convey a security token over a network and are subject to electronic interception, the present invention requires a user 105 to physically travel to a storefront 195, where a user 105 is provided the requested security token after their identity has been verified.

The request 102 action can be initiated over a network 140 from a client 110. For example, a user 105 can utilize a Web interface 160 of the client 110 to request a PKI certificate 184 or other security token (184). The interface 160 can prompt the user 105 for identifying information, such as a phone number, name, address, and zip code. A Web server 150 linked to a back-end server 144 can receive this request information. The back-end server 144 can record the request information in a data table 156 of an accessible data store 152. The back-end server 144 can connect with a certificate authority server 146 over a secure channel which provides the server 144 with a security token (184).

In one embodiment, the server 144 can be associated with a mobile telephony provider which can provide mobile telephony service to a subscribing user 105. In such a scenario, the server 144 can access information stored for the user 105 and compare it against information provided via the Web interface 160. When this information is inconsistent, the PKI request can be terminated for security reasons. For enhanced security, the server 144 can require the security token (184) request be issued from a mobile phone (client 110) for which the mobile telephony provider provides a service. Similarly, the server 144 can verify a request by calling a subscribing mobile device associated with a subscription plan. Once the security token 184 is received from the certificate authority 146, a storefront 195 near the user 105 can be identified. This storefront can be explicitly selected by the user through interface 160 (not shown) or can be determined based upon a zip code or subscriber address.

In one arrangement, the security token 184 that is delivered to a storefront 195 can require activation, using an activation key 122. This activation key 122 can be automatically generated by the server 144 and mailed 124 or otherwise conveyed to the user 105. When conveyed though postal mail to a postal address, the server 144 may restrict the address to one associated with a mobile phone subscription. The activation key 122 can be a personal identification number (PIN), an alphanumeric sequence, or other security code. The message 122 that includes the activation key 122 can specify which storefront the security token 184 can be obtained from. A secure communication means can be used to convey the security token 184 to a store server 148 located at the storefront 195.

The store server 148 can be linked to one or more service terminals 190. A service terminal 190 can be a kiosk designed for self-service or can be a terminal used by a customer service agent. When the user 105 enters the storefront 195, he/she can provide identification information 182 to verify their identity. When properly identified, the security token 184 can be delivered. In one arrangement, the token 184 can be delivered to a storage area of a mobile telephony device 180. Further, an additional check can require the mobile telephony device 180 to be a device that the store server 148 identifies as belonging to user 105. For example, the device 180 can be one which the mobile telephony provider provides service to.

As shown in system 100, the identification information 182 can include any information able to verify an identity of a user 105 matches that of a person for whom the security token 184 is to be delivered. In one embodiment, the identification information 182 can be a photo identification, such as a driver's license, a military ID, a state ID, and the like. The identification information 182 can also include a credit card, which may be swiped to an automated kiosk 190 to confirm an identity of user 105 or presented to a customer service agent for the same purpose. The identification information 182 can also be verbally conveyed information or information digitally conveyed from device 180 which is able to be compared against subscriber information maintained by the mobile telephony provider. The identification information 182 can further include a PIN 122 or other authentication key which was previously sent 124 to the user 105 and is required before the security token 184 is delivered.

The security token 184 can be a key uniquely associated with a user 105 which has been produced by a certificate authority 146. The security token 184 can be a PKI certificate 184 which can be utilized for authentication purposes to verify an identity with a system that requires strong authentication credentials. In one embodiment, the PKI certificate 184 can be used as a single authenticating token which can be used across a large number of unrelated Web sites accessible over a public internet.

The PKI certificate 184 can be delivered to the user 105 in either an activated or a de-activated state. When the PKI certificate 184 is delivered in an activated state, it can be conveyed by the user 105 to any computing device and immediately used. When delivered in a de-activated state, the user 105 will be required to active the certificate 184 before using it. Activation can require a communication with an activation server 142 and can require that a user provide the delivered PIN 122.

Figure 2:
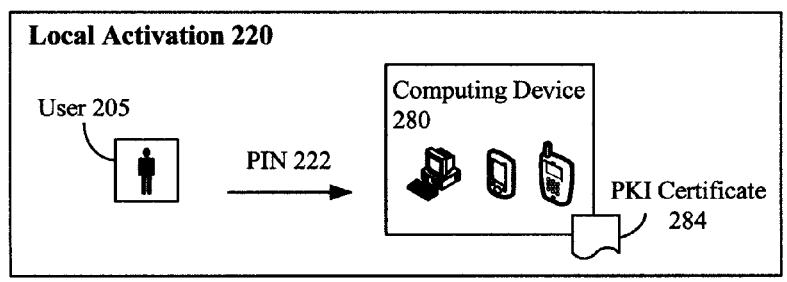
FIG. 2 is a schematic diagram showing procedures for activating a PKI certificate in accordance with an embodiment of the inventive arrangements disclosed herein.
Figure 2:
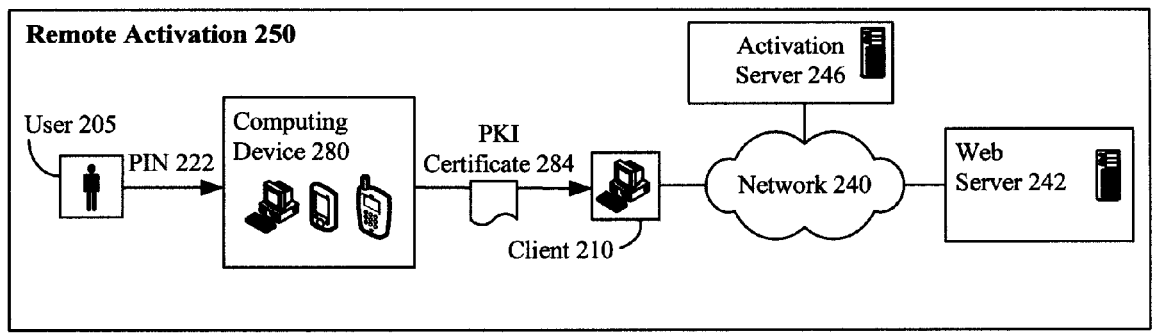

FIG. 2 shows a system 200 that illustrates two different activation situations which include local activation 220 and remote activation 250. These activation situations 220, 250 are not intended to constrain the invention and other activation techniques can be utilized and still be considered within the scope of the present invention.

In the local activation 220 situation, a user 205 can input the PIN 222 (which is equivalent to PIN 122) to a computing device 280 within which the PKI certificate 284 is stored. The computing device 280 can include a software program able to activate the PKI Certificate 284 whenever a proper PIN 222 is entered. The computing device 280 can be the mobile telephony device 280 (e.g., device 180, client 105, or any other machine capable of executing the software program that activates the PKI certificate 284). Once activated, the PKI certificate 284 can be used regardless of which device 280 it is contained within. That is, the user 205 can convey an activated certificate 284 to any device upon which the certificate 284 is to be used. In one configuration, security measures can be imposed to prevent an activated certificate 284 from being conveyed from one device to another, in which case the user 205 may be required to activate the certificate 284 once it has been conveyed to a new computing device.

In the remote activation 250 situation, activation of the PKI certificate 284 can occur within a remotely located activation server 246. That is, the user 205 may be input the PIN 222 to device 280 or a client 210 to which the PKI certificate 284 has been conveyed. This device 210 can be communicatively linked to a network 240 connected to both the activation server 246 and a Web server 242 to which the certificate 284 authenticates the user 205. When activation occurs in the activation server 246, each use of the certificate 284 can require a communication with the server 246. As such, a Uniform Resource Locator (URL) for the activation server 246 can be specified within the PKI certificate 284 so that a utilizing server 242 knows where to check to determine whether the certificate 284 has been activated. While the remote activation 250 embodiment is potentially more secure than the local activation 220 embodiment, utilization of the PKI certificate 284 for authentication purposes is dependent upon the activation server 246 being online and accessible.

Figure 3:
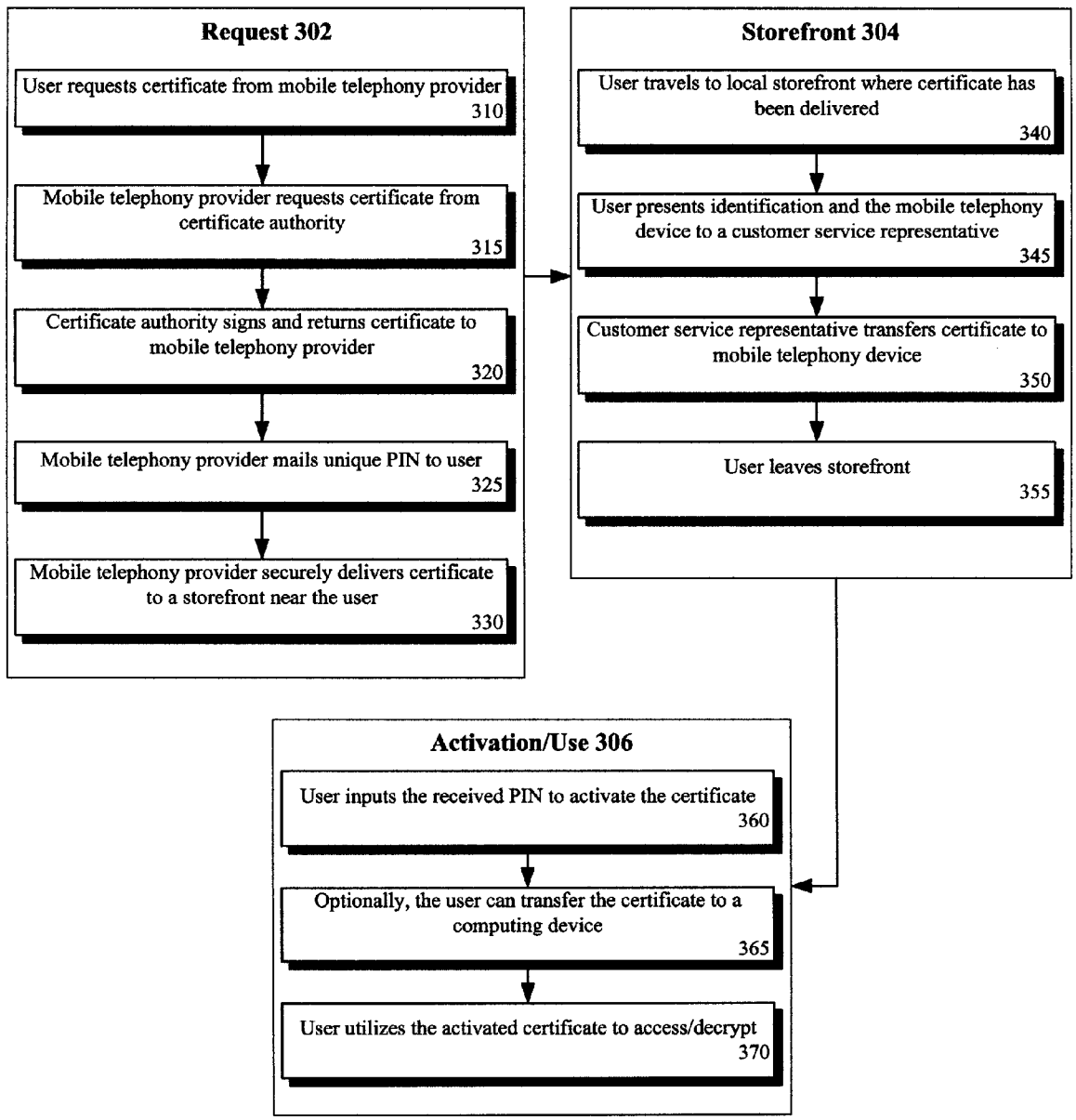
FIG. 3 is a flow chart of a method for the secure distribution of a PKI certificate through a mobile telephony provider in accordance with an embodiment of the inventive arrangements disclosed herein.

FIG. 3 is a flow chart of a method 300 illustrating a secure distribution of a PKI certificate through a mobile telephony provider as described herein. Method 300 can be performed in the context of system 100. The method 300 can include multiple asynchronously occurring processes that include a request 302 process, a storefront 304 process, and an activation/use 306 process.

The request 302 process can begin in step 310, where the user can request a PKI certificate or other security token from a mobile telephony provider. More than one method of requesting the certificate can be available to the user, including but not limited to, a Web page, an automated telephony system, a physical request in a storefront, and the like. In step 315, the mobile telephony provider can request the PKI certificate from a certificate authority. In step 320, the certificate authority can sign and return the PKI certificate to the mobile telephony provider. The PKI certificate can be transferred in many secure ways, including, but not limited to, being transferred in a vehicle on a storage medium, transferred through a secure network, and the like. In step 325, the mobile telephony provider can optionally send a unique PIN or other activation key associated with the PKI certificate to the user, which can be used to remove the risk of theft of the certificate by employees of the telephony provider prior to it being delivered to the requester. This message conveyance can occur through postal mail, a message delivered to a subscribing mobile device, through a fax message, and the like. In step 330, the mobile telephony provider can securely deliver the PKI certificate to a storefront near the user. The PKI certificate can be transferred in many secure ways, including, but not limited to, being transferred in a vehicle on a storage medium, conveyed through carrier or postal mail, transferred through a secure network, and the like.

Once the request process 302 has been performed, the storefront 304 process can be utilized by a requestor. The storefront 304 process can begin in step 340, where a user can travel to the local storefront where the PKI certificate has been delivered. In step 345, the user can present identification information and a mobile telephony device to a customer service representative. In step 350, the customer service representative can verify the user's identity and can transfer the PKI certificate to the mobile telephony device. The certificate can be transferred in many ways, including, but not limited to, a transfer cable that connects directly to the device, BLUETOOTH, or a network. Storage mediums other than a memory of a mobile device can also be used to receive the PKI certificate. In step 355, the user leaves the storefront with the PKI certificate.

After the user has received the PKI certificate, the activation/use 306 process can be performed. The activation/use 306 process can begin in step 360, where a user can input a PIN or activation key to activate the PKI certificate. Activation can be done in many ways including, but not limited to, on the mobile telephony device, on a computer using an existing network connection, through an automated telephony system, via an authentication server, and the like. In step 365, the user can optionally transfer the certificate to a computing device for further use. In step 370, the user can use the activated certificate to access secured information or to decrypt encrypted information.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for distributing a public key infrastructure (PKI) certificates comprising:
   receiving an electronically submitted user request for the PKI certificate from a remotely located computing device, wherein the user request is associated with a specific user;
   submitting the user request to a certificate authority server;
   receiving the PKI certificate from the certificate authority server for the specific user responsive to the submitted user request;
   determining one of a plurality of storefronts geographically located proximate to the specific user;
   securely conveying the PKI certificate to the determined storefront along with a message indicating an identity of the specific user of the PKI certificate;
   requiring a person physically present in the storefront who is attempting to pick-up the PKI certificate to produce personal identifying information, wherein said personal identifying information comprises an identifier of a mobile telephone associated with the person; and
   comparing the identifier of the mobile telephone with a recorded identifier of a telephone identified within records accessible by the storefront as being associated with the specific user, wherein delivery of the PKI certificate is dependent upon the received identifier matching the recorded identifier;
   selectively delivering the PKI certificate at the storefront to a memory space of the mobile telephone of the person present in the storefront depending upon whether the personal identifying information confirms the person is the specified user, wherein successful confirmation leading to the delivery of the PKI certificate to the memory space requires that the received identifier matches the recorded identifier.

2. The method of claim 1, wherein the storefront is a mobile telephone storefront, and wherein the specified user is a subscriber of a mobile telephony provider.

3. The method of claim 2, further comprising:
   generating a personal identification number (PIN); and
   conveying the personal identification number (PIN) to a postal address that the mobile telephony provider has recorded for the specific user, wherein use of the delivered PKI certificate requires activation, wherein the activation requires the personal identification number (PIN) as input.

4. The method of claim 1, further comprising:
   a machine present in the storefront digitally receiving the identifier of the mobile telephone from mobile telephone.

5. The method of claim 4, wherein the machine is a self-service kiosk present in the storefront.

6. The method of claim 1, wherein the personal identifying information comprises at least one photo identification document.

7. The method of claim 1, wherein the mobile telephone represents any mobile communication device that a mobile telephony provider provides telephony service to.

8. The method of claim 1, further comprising:
   generating an activation key, wherein the PKI certificate of the delivering step requires the activation key for activation; and
   conveying the activation key to a postal address of the specific user.

9. The method of claim 8, wherein the activation key is a personal identification number (PIN).

10. The method of claim 8, wherein an entity associated with the plurality of storefronts has a pre-existing relationship with the specified user unrelated to the PKI certificate, wherein a recorded postal address for the specified user is maintained by the entity as part of the pre-existing relationship, and wherein the postal address to which the activation key is conveyed is the recorded postal address.

11. The method of claim 8, wherein the plurality of storefronts are associated with a corporate entity, and wherein said plurality of storefronts comprise a plurality of storefronts geographically located in a plurality of states of the continental United States.

12. The method of claim 11, wherein subsequent use of the activated PKI certificate requires a confirmation of activation involving the activation server.

13. The method of claim 8, further comprising:
   activating the PKI certificate utilizing the activation key via a remotely located activation server.

14. A public key infrastructure (PKI) certificate distribution system comprising:
   a Web server configured to receive requests for PKI certificates from users via an unsecured network connection;
   a certificate authority server configured to generate PKI certificates responsive to requests from the Web server;
   a plurality of physical storefronts;
   a plurality of mobile telephones of the users; and
   a distribution server configured to manage PKI certificate requests that the Web server receives, to securely obtain PKI certificates from the certificate authority server for each received request, and to securely convey the obtained PKI certificates to memory spaces of the plurality of mobile telephones of the users that made a corresponding request to the Web server, and wherein delivery of the PKI certificate to the plurality of mobile telephone is contingent upon the corresponding one of the users physically traveling to the physical storefronts, wherein the users are only able to receive delivery of the requested PKI certificates to a memory space of their mobile phone after presenting identification information at the physical storefront, the identifying information comprising an identifier of the user's mobile phone, where delivery of the requested PKI certificate to the memory space requires that the identifier of the user's mobile phone matches a recorded identifier maintained in a database accessible by the storefront that matches recorded identifiers with users and requires that the user associated with the recorded identifier matches the user present in the physical storefront.

15. The distribution system of claim 14, wherein the distribution server is further configured to identify an activation key that is required for activation of the PKI certificate and to convey this activation key to a postal address of a user that requested the PKI certificate.

16. The distribution system of claim 15, further comprising:
   an authentication server configured to activate PKI certificate received from the storefronts in a de-activated state responsive to receiving a correct activation key from a user.

17. The distribution system of claim 14, wherein the plurality of storefronts are storefronts of a mobile telephone service provider.

18. The distribution system of claim 14, wherein the distribution server is a mobile telephony provider server, wherein the PKI certificates are only distributed to subscribers of the mobile telephone service provider, wherein subscriber specific information maintained by the mobile telephony provider is utilized to enhance security of the distribution system.

19. A method of leveraging mobile telephone provider assets to securely deliver public key infrastructure (PKI) certificates comprising:
- receiving an electronically submitted user request for a PKI certificate from a remotely located computing device, wherein the user request is associated with a specific user;
- submitting the user request to a certificate authority server;
- receiving the PKI certificate from the certificate authority server for the specific user responsive to the submitted user request;
- distributing the PKI certificate to physical storefront associated with a mobile telephone provider, said storefront being a storefront proximate to a requesting user;
- conveying an activation key to the requesting user;
- requiring the requesting user to physically travel to the storefront to receive the PKI certificate;
- verifying an identity of the requesting user at the storefront, wherein the verification requires the user's identity matches records accessible by the storefront that matches the requesting user to a mobile telephone; and
- providing the PKI certificate to a memory space of the mobile telephone when the requesting user has been successfully verified, wherein the provided PKI certificate requires activation involving the activation key.

20. The method of claim 19, wherein the user request for the PKI certificate is received by a Web server, which submits the user requests to the certificate server.

* * * * *